US012534698B2

(12) United States Patent
Goral et al.

(10) Patent No.: US 12,534,698 B2
(45) Date of Patent: Jan. 27, 2026

(54) FIXED BED CELL CULTURE AND HARVESTING SYSTEM AND METHODS OF USING THE SAME (71) Applicant: CORNING INCORPORATED, Corning, NY (US)

(72) Inventors: Vasiliy Nikolaevich Goral, Painted Post, NY (US); Kathleen Anne Krebs, Painted Post, NY (US); William Joseph Lacey, North Andover, MA (US); Mackenzie Anna Maloney, Elmira, NY (US); Todd Marshall Wetherill, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 908 days.

(21) Appl. No.: 17/779,880

(22) PCT Filed: Nov. 4, 2020

(86) PCT No.: PCT/US2020/058763
§ 371 (c)(1),
(2) Date: May 25, 2022

(87) PCT Pub. No.: WO2021/108093
PCT Pub. Date: Jun. 3, 2021

(65) Prior Publication Data
US 2022/0411738 A1 Dec. 29, 2022

Related U.S. Application Data (60) Provisional application No. 62/941,010, filed on Nov. 27, 2019.

(51) Int. Cl.
C12M 1/26 (2006.01)
C12M 1/00 (2006.01)
C12M 1/12 (2006.01)

(52) U.S. Cl.
CPC ............ *C12M 33/04* (2013.01); *C12M 23/20* (2013.01); *C12M 25/14* (2013.01); *C12M 29/10* (2013.01);
(Continued)

(58) Field of Classification Search
CPC ...... C12M 33/04; C12M 33/12; C12M 23/20; C12M 25/14; C12M 29/10; C21N 2513/00; C21N 2533/30
See application file for complete search history.

(56) References Cited

U.S. PATENT DOCUMENTS 3,027,305 A 3/1962 Freeman
4,833,083 A 5/1989 Saxena
(Continued)

FOREIGN PATENT DOCUMENTS

CN 103476924 A 12/2013
CN 104903435 A 9/2015
(Continued)

OTHER PUBLICATIONS

Chinese Patent Application No. 202080082853.8, Office Action dated Aug. 17, 2024, 5 pages (English Translation only), Chinese Patent Office.
(Continued)

Primary Examiner — Michael L Hobbs
(74) Attorney, Agent, or Firm — F. Brock Riggs (57) ABSTRACT A cell culture system is provided that includes a cell culture vessel having an interior cavity to house a cell culture substrate in a cell culture space, and at least one port for at least one of fluid inlet to the interior cavity and fluid outlet from the interior cavity. The system further includes a piston having a distal end disposed in the cell culture vessel above the cell culture space, the distal end of the piston being sealed with an airtight seal within the interior cavity. The
(Continued)

system also includes a driver coupled to the piston to move the piston so as to increase and decrease a distance between the distal end and the cell culture space. The driver can pressurize the interior cavity via actuation of the piston to harvest cells from the cell culture space through the at least one port.

19 Claims, 5 Drawing Sheets

(52) U.S. Cl.
CPC ......... *C12M 33/12* (2013.01); *C12N 2513/00* (2013.01); *C12N 2533/30* (2013.01)

(56) References Cited

U.S. PATENT DOCUMENTS

| | | | |
|---|---|---|---|
| 5,501,971 A | 3/1996 | Freedman et al. | |
| 5,510,262 A | 4/1996 | Stephanopoulos et al. | |
| 8,845,902 B2 | 9/2014 | Pralong et al. | |
| 9,273,278 B2 | 3/2016 | Lee et al. | |
| 9,657,266 B2 | 5/2017 | Kasuto et al. | |
| 11,111,470 B2 | 9/2021 | Ferrie et al. | |
| 11,434,460 B2 | 9/2022 | Ferrie et al. | |
| 2003/0143727 A1* | 7/2003 | Chang .................. | C12M 23/26 435/289.1 |
| 2004/0235153 A1* | 11/2004 | Takagi .................. | C12M 35/04 435/293.2 |
| 2015/0299634 A1 | 10/2015 | Drugmand et al. | |
| 2016/0222429 A1 | 8/2016 | De Villiers et al. | |
| 2020/0248121 A1 | 8/2020 | Ferrie et al. | |
| 2023/0383237 A1 | 11/2023 | Cattaruzzi et al. | |
| 2024/0254421 A1 | 8/2024 | Ferrie et al. | |

FOREIGN PATENT DOCUMENTS

| | | | |
|---|---|---|---|
| CN | 106232801 A | 12/2016 | |
| CN | 115786112 A | 3/2023 | |
| CN | 117561324 A | 2/2024 | |
| DE | 102008039812 A1 | 3/2010 | |
| EP | 2130905 A1 * | 12/2009 | ............ C12M 23/34 |
| EP | 3450535 A1 | 3/2019 | |
| JP | 2000-262269 A | 9/2000 | |
| WO | 2005/037984 A1 | 4/2005 | |
| WO | 2014/093439 A1 | 6/2014 | |
| WO | 2019/104069 A1 | 5/2019 | |
| WO | 2021/108072 A1 | 6/2021 | |
| WO | 2022/076519 A1 | 4/2022 | |

OTHER PUBLICATIONS

International Search Report and Written Opinion of the International Searching Authority; PCT/US2020/058763; mailed on Feb. 16, 2021, 9 pages; European Patent Office.
Karen A. Simon; et al., "Biomaterials", "Polymer-based mesh as supports for multi-layered 3D cell culture and assays", 2013, pp. 1-10.
Chinese Patent Application No. 202080082853.8, Office Action dated Feb. 28, 2025, 5 pages (English Translation only), Chinese Patent Office.
Weber et al., "Expansion of human mesenchymal stemcells in a fixed-bed bioreactor system based on nonporous glass carrier—Part A: Inoculation, cultivation, and cell harvest procedures", Int J Artif Organs 2010; 33 (8), pp. 512-525.

* cited by examiner

FIXED BED CELL CULTURE AND HARVESTING SYSTEM AND METHODS OF USING THE SAME

CROSS REFERENCE TO RELATED APPLICATIONS

This is a national stage application under 35 U.S.C. § 371 of International Application No. PCT/US2020/058763, filed Nov. 4, 2020,which claims the benefit of priority under 35 U.S.C § 120 of U.S. Provisional Application Ser. No. 62/941,010 filed on Nov. 27, 2019, the content of which are relied upon and incorporated herein by reference in their entirety.

FIELD OF THE DISCLOSURE

The present disclosure generally relates to the bioprocess field and, in particular, to a packed-bed bioreactor and a method for using the bioreactor for performing a cell culture including cell harvest.

BACKGROUND

In the bioprocessing industry, large scale cultivation of cells is performed for purposes of the production of hormones, enzymes, antibodies, vaccines and cell therapies. A significant portion of the cells used in bioprocessing are anchorage dependent, meaning the cells need a surface to adhere to for growth and functioning. Traditionally, the culturing of adherent cells is performed on two-dimensional (2D) cell-adherent surfaces incorporated in one of a number of vessel formats, such as T-flasks, petri dishes, cell factories, cell stack vessels, roller bottles, and HYPERStack® vessels. These approaches can have significant drawbacks, including the difficulty in achieving cellular density high enough to make it feasible for large scale production of therapies or cells.

Alternative methods have been suggested to increase volumetric density of cultured cells. These include microcarrier cultures performed in stir tanks. In this approach, cells that are attached to the surface of microcarriers are subject to constant shear stress, resulting in a significant impact on proliferation and culture performance. Another example of a high-density cell culture system is a hollow fiber bioreactor, in which cells may form large three-dimensional aggregates as they proliferate in the interspatial fiber space. However, the cells growth and performance are significantly inhibited by the lack nutrients. To mitigate this problem, these bioreactors are made small and are not suitable for large scale manufacturing.

Another example of a high-density culture system for anchorage dependent cells is a packed bed bioreactor system. For example, packed bed bioreactor systems that contain a packed bed of support or matrix systems to entrap the cells have been previously disclosed U.S. Pat. Nos. 4,833,083; 5,501,971; and 5,510,262. Packed bed matrices usually are made of porous particles as substrates or non-woven microfibers of polymer. Such bioreactors function as recirculation flow-through bioreactors. One of the significant issues with such bioreactors is the non-uniformity of cell distribution inside the packed bed. For example, the packed bed functions as depth filter with cells predominantly trapped at the inlet regions, resulting in a gradient of cell distribution during the inoculation step. In addition, due to random fiber packaging, flow resistance and cell trapping efficiency of cross sections of the packed bed are not uniform. For example, medium flows fast though the regions with low cell packing density and flows slowly through the regions where resistance is higher due to higher number of entrapped cells. This creates a channeling effect where nutrients and oxygen are delivered more efficiently to regions with lower volumetric cells densities and regions with higher cell densities are being maintained in suboptimal culture conditions. Another significant drawback of packed bed systems disclosed in a prior art is the inability to efficiently harvest intact viable cells at the end of culture process. U.S. Pat. No. 9,273,278 discloses a bioreactor design to improve the efficiency of cell recovery from the packed bed during cells harvesting step. It is based on loosening the packed bed matrix and agitation or stirring of packed bed particles to allow porous matrices to collide and thus detach the cells. However, this approach is laborious and may cause significant cells damage, thus reducing overall cell viability.

In other current solutions available on the market, cells cannot be easily harvested from perfusion bioreactors using standard enzymatic methods. Instead, virus recovery via cell lysis with detergent is used, which adds time and complexity to down-stream purification of the virus.

While manufacturing of viral vectors for early-phase clinical trials is possible with existing platforms, there is a need for a platform that can produce high-quality product in greater numbers in order to reach late-stage commercial manufacturing scale. In particular, there is a need for a platform and methods for compartmentalizing the packed bed while managing fluid flow of cells and nutrients through the bed, and aeration of the cell culture medium.

SUMMARY

Disclosed herein is a cell culture system is provided that includes a cell culture vessel having an interior cavity to house a cell culture substrate in a cell culture space, and at least one port for at least one of fluid inlet to the interior cavity and fluid outlet from the interior cavity. The system further includes a piston having a distal end disposed in the cell culture vessel above the cell culture space, the distal end of the piston being sealed with an airtight seal within the interior cavity. The system also includes a driver coupled to the piston to move the piston so as to increase and decrease a distance between the distal end and the cell culture space. The driver can pressurize the interior cavity via actuation of the piston to harvest cells from the cell culture space through the at least one port.

Also disclosed is a method of using a cell culture system to culture and harvest cells from a cell culture vessel using the actuation of a piston disposed at least partially within the vessel. The piston is used to draw into the vessel one or more solutions, including a wash solution and a dissociation solution to separate cells from a substrate. The piston is then used to draw out a fluid containing the dissociation solution, cells, and any cell byproducts from the vessel and into a harvest container.

Additional aspects of the present disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the disclosure as disclosed.

BRIEF DESCRIPTION OF THE DRAWINGS

A more complete understanding of the present disclosure may be had by reference to the following detailed description when taken in conjunction with the accompanying drawings wherein.

DETAILED DESCRIPTION

Various embodiments of the present disclosure will be discussed with reference to the figures, which illustrate various aspects of packed-bed bioreactor systems and related methods of using the bioreactor systems according to non-limiting embodiments of the present disclosure. The following description is intended to provide an enabling description of the bioreactor systems and the various aspects of the bioreactor systems and methods will be specifically discussed in detail throughout the disclosure with reference to the non-limiting embodiments, these embodiments are interchangeable with one another within the context of the disclosure.

Figure 1:
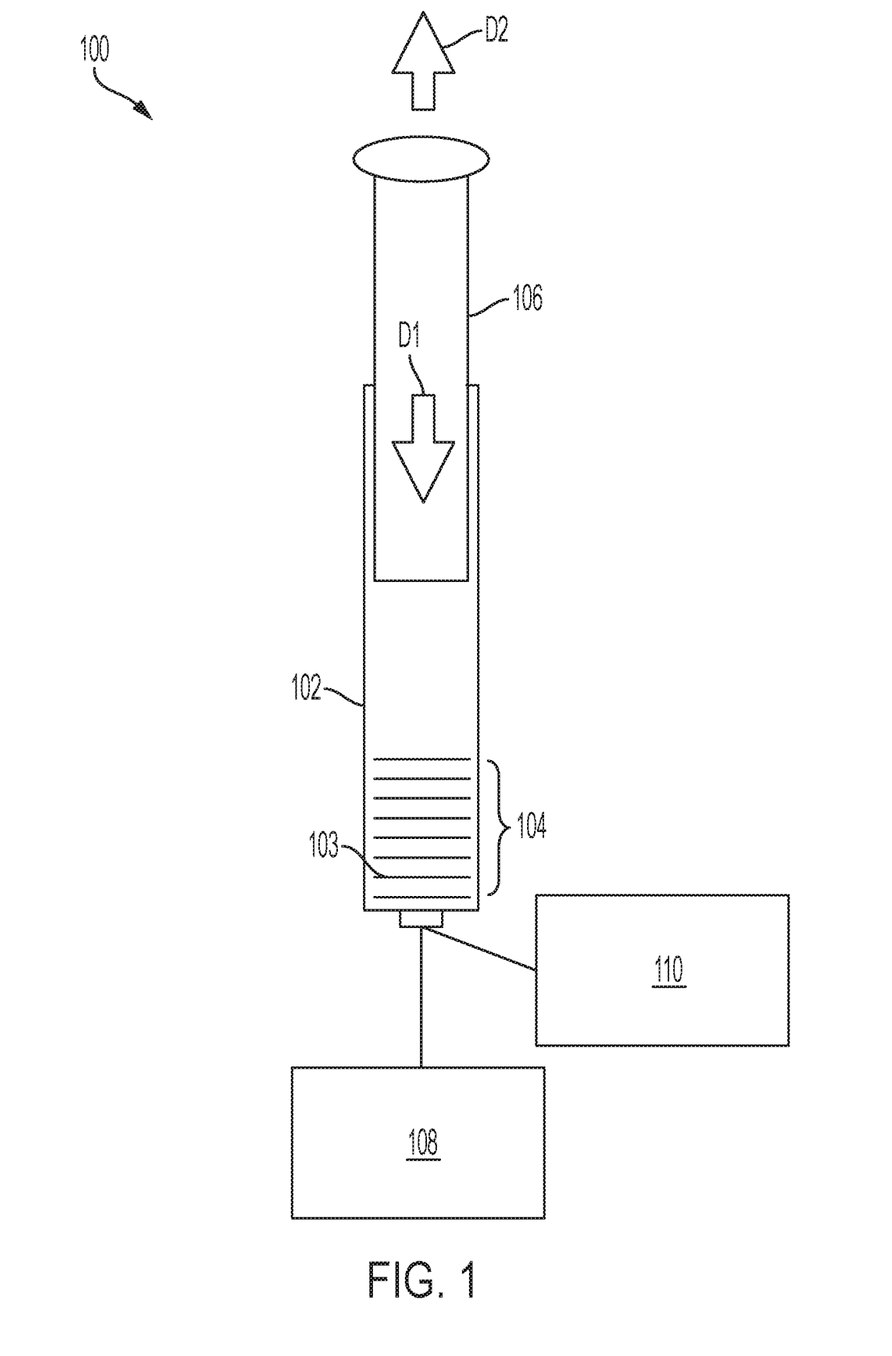
FIG. 1 illustrates a schematic of a cell culture system enabling cell harvest, according to embodiments of the present disclosure.

Referring to FIG. 1, a schematic illustration of a packed-bed bioreactor system 100 is provided in accordance with one or more embodiments of the present disclosure. The bioreactor system 100 enables not only the culturing of adherent cells and harvesting of cell byproducts (e.g., transfected viruses), but also harvesting of the cells themselves. As shown, the bioreactor 100 includes a vessel 102 containing a cell culture substrate 104. The cell culture substrate can take a variety of forms, but is preferably a porous material provided in a monolithic structure (such as a foam substrate or single woven mesh sheet) or in a packed-bed configuration of a plurality of pieces of substrate material 103. In one preferred embodiment, for example, the plurality of pieces of substrate material 103 are sheets or discs of a porous polymer made from one or more polymer fibers. For example, the porous polymer material can be a woven mesh substrate material provided as a stack of sheets or discs within the vessel 102.

The vessel 102 of FIG. 1 is a simplified plunger design to illustrate the general structure and operation of a cell culture vessel that enables cell harvesting, according to embodiments of this disclosure. Specifically, the vessel 102 includes a plunger 106 arranged to move at least partially within the vessel toward and away from the cell culture substrate 104 in directions D1 and D2. This pumping action, as will be described below, pressurizes or depressurizes the interior of the vessel 102 to draw in one or more solutions from sources 108 and 110 (e.g., a harvest solution or a DPBS (Dulbecco's Phosphate-Buffered Saline) wash) to aid in releases adhered cells from the cell culture substrate 104, and to also eject those released cells from the interior of the vessel, all without damaging the cells or virus product. The sources 108 and 110 can contain different enzymatic and non-enzymatic dissociation agents to target the interactions between the cell-to-substrate and cell-to-cell.

The bioreactor systems and methods of this disclosure provide advantages in terms of automation, viable cell harvest yield, and scalability. According to an aspect of some embodiments, the bioreactor systems disclosed herein can pressurize the vessel and generate a safe flow rate that will not damage the cells or harvested product. The action of the pressurization for harvesting can be automated and fully integrated into a bioreactor controller system. For example, the plunger can be actuated by a pneumatic piston or some other electro-mechanical driver controlled by a controller. In addition, the solutions provided herein can be scaled to larger bioreactors used in the industry (e.g., vessels that are 50 L or more). The embodiments of this disclosure generate high pressure and flow within the bioreactor system by using, for example, a pneumatic cylinder that pushes down against a cell culture substrate and is then lifted, and the pneumatic cylinder may be continually pumped up and down to induce cell detachment from the substrate after treatment of the substrate with a dissociation agent.

Current commercial products, which tend to use non-uniform substrates, trap cells nonuniformly in the substrate during attachment. This leads to a nonuniform cell growth and subsequent inefficient transfection of the DNA plasmids into the cells. This negatively impacts the total virus produced by the cells. In addition, because many of the cells become trapped, they cannot efficiently recover the virus inside the cells for later use in gene therapy. Currently as a work-around, detergents are used to lyse cells and release virus in situ; however, the addition of detergent adds cost and complexity to downstream virus purification steps. The embodiments of this disclosure eliminate the need for cell lysis, since the pressure delivered from the automated piston should facilitate cell release from the bioreactor substrate. As an aspect of embodiments of this disclosure, a suitable cell culture substrate will enhance the flow uniformity and release of cells for harvesting. Examples of such substrate materials are disclosed in U.S. patent application Ser. Nos. 16/781,685; 16/781,723; and 17/039,218 and PCT Application Publication No. WO 2019/104069, the contents of which are incorporated herein by reference in their entirety.

Figure 2:
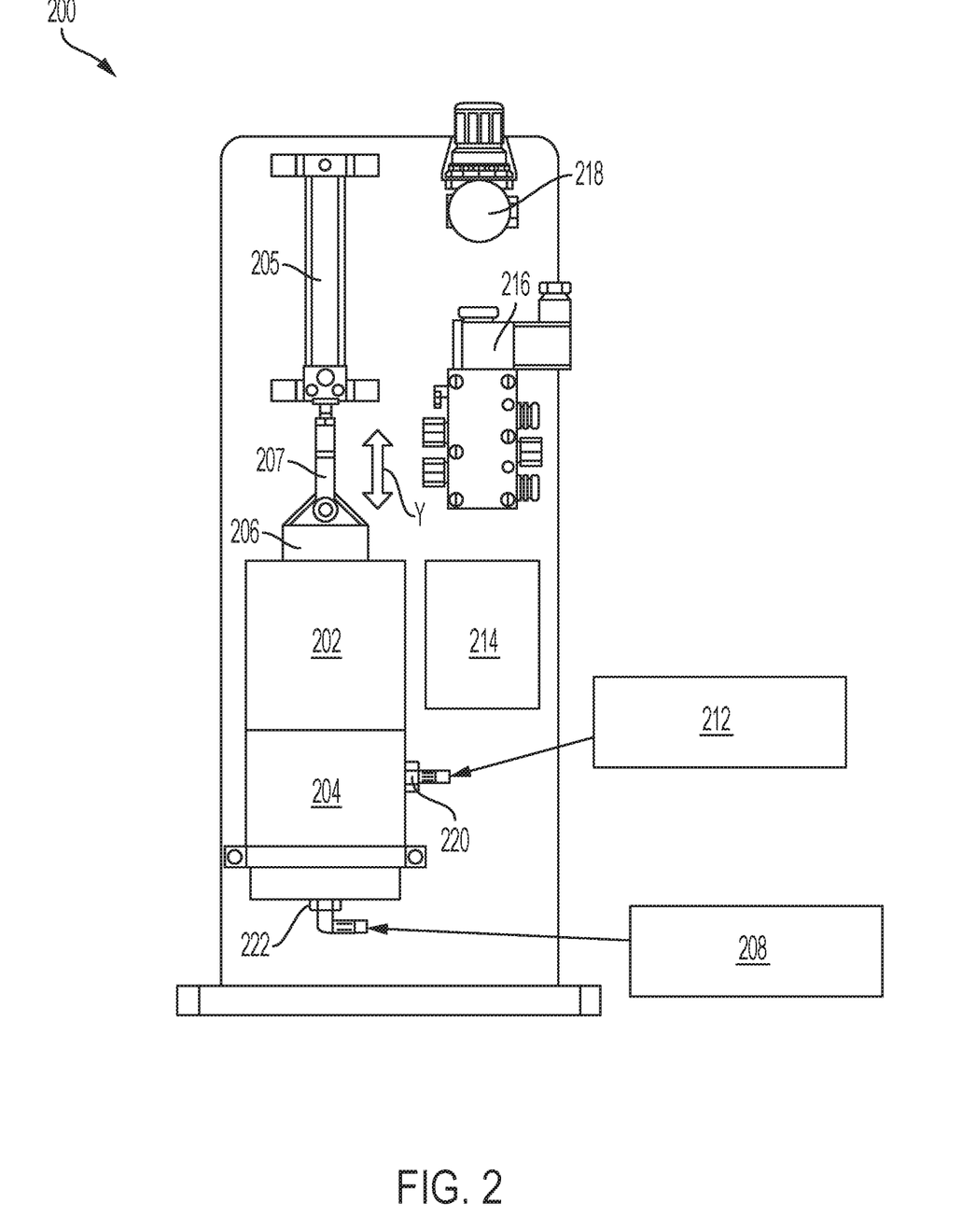
FIG. 2 illustrates a schematic of a cell culture system enabling cell harvest, according to embodiments of the present disclosure.

FIG. 2 is a schematic illustration of a cell culture system 200 according to one or more embodiments. The system 200 includes a cell culture vessel 202 having an interior cavity at least partially filled with a cell culture substrate 204, and one or more fluid inlets and/or outlets 220, 222 arranged to deliver fluid to or extract fluid, including air and cell culture media, to and from the interior cavity. A driver 205 (such as a pneumatic driver or air cylinder) is disposed above the cell culture vessel 202 and is linked via a connection 207 (e.g., a clevis) to a piston 206 that is at least partially inserted into the cell culture vessel 202. The system 200 further includes a driver control 216. The driver control 216 can be any control known in the art able to control actuation of the driver 205. As shown in FIG. 2, the system 200 also includes a pressure regulator 218 that is connected to a gas or air supply. The pressure regulator 218, gas or air supply, valves, and driver control 216 control entrance of air and media into the bioreactor. The inlets and/or outlets 220, 222 are connected to one or more fluid supplies. According to various embodiments, the inlets and/or outlets 220, 222 can both be connected to the same fluid supply or to different fluid supplies, and are each controlled by one or more valves to control the inflow or outflow of fluid from the inlets and/or outlets 220, 222. A controller 214 for controlling fluid flow and driver actuation during cell harvest can be nitrated into the system 200 or housed in a separate computer that communicates with the system according to known wired or wireless connection methods.

During harvest, the substrate and cells are soaked in a dissociation buffer or enzyme. Then, air would come from the air supply via the regulator 218, where the pressure of the air is controlled by the regulator 218. A valve is opened to allow the pressurized air to travel to the driver 205. As a result, the incoming pressurized air would push down on the piston 206 that is sealed inside the top of the vessel 202. When the piston 206 moves down, it puts pressure on the fluid inside the vessel 202 and results in the cells moving down through the substrate with the liquid and exiting out the bottom of the vessel 202 at outlet 222 into a harvest collection vessel 208.

According to embodiments, the flow rate of dissociation agent into and through the vessel 202 can be increased to improve cell harvest yield. The flow rate of dissociation agent can be, for example, from about 1 ml/min to about 500 ml/min, or about 250 ml/min, where the higher flow rates can yield greater harvesting yields.

Figure 3:
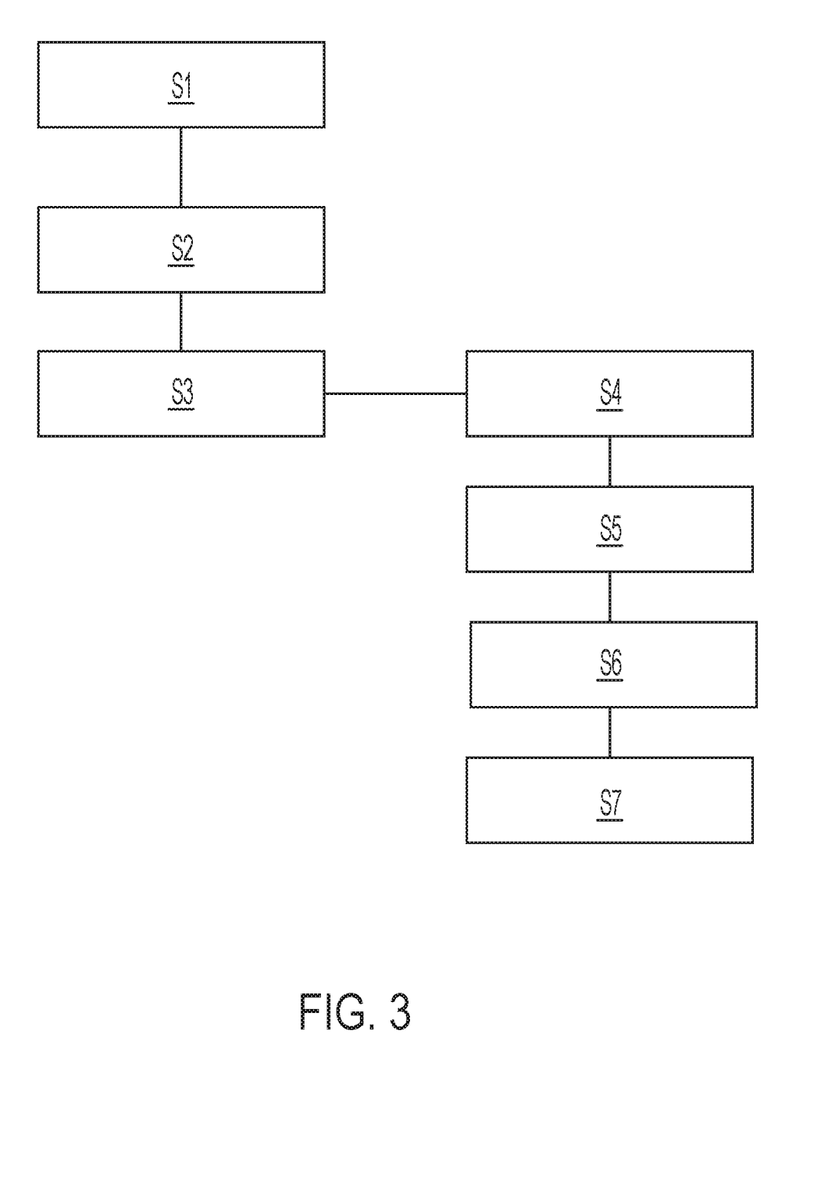
FIG. 3 is a flow chart showing a method of culturing cells, according to embodiments of the present disclosure.

The following aspects of embodiments illustrate the method of harvesting cells from the system 200 described above. During cell culture, the piston 206 is at least partially within the vessel 202. The position of the piston 206 during cell culture, before harvesting, can be resting against the top of the cell culture substrate 204 to hold the substrate in place and immobilized during culture. Alternatively, the vessel 202 can include a separate cell culture chamber or other supports to restrict and/or support the cell culture substrate 204. With reference to FIG. 3, the initial phase of cell culture is the cell attachment phase S1, during which the bioreactor vessel 202 is perfused with media, cells are seeded into vessel 202 through an inlet, controls set the vessel 202 and media to a desired temperature (e.g., 37° C.), cell culture media is fed through vessel 202 at a designated speed, and relevant nutrient, oxygen, and $CO_2$ levels are set.

Next, the cell culture enters the cell growth stage S2. During this time, data can be collected to monitor the progress of the cell culture. This data can include information on cell metabolites, pH levels, gas measurements, cell confluence or biomass, and temperature. The cell growth phase can continue for a number of days while this data is monitored, and the system is refreshed with conditioned media as needed.

After at least one or two days of the cell culture phase, cell harvesting can begin at step S3. At the outset of harvest, the piston 206 may remain pushed against the top of the substrate 204 and the valve between vessel 212 and vessel 202 is opened, as well as the valve between vessel 208 and vessel 202. The system is then pressurized or a pump connected to vessel 208 is activated to supply DPBS wash from the vessel 208 into the vessel 202, and excess DPBS wash can be collected in vessel 212 S4. Next, the valve to vessel 212 is closed, and the valve at inlet 222 is switched from the DPBS wash supply to a harvest solution supply in vessel 208. Then, the piston 206 moves up and down in accordance with the control system, which pulls up the dissociation agent into the vessel 202 at step S5. The pressure from piston 206 and resulting influx of dissociation agent also results in shear stress on the cells to release them from the substrate 204. The piston 206 is left in lifted position for a predetermined period so that all of the dissociation agent can sit in the vessel 202 to prove sufficient exposure time of the cells to the dissociation agent. After this exposure time, at step S6, piston 206 is forcefully pushed down, expelling a combination of media, dissociation agent, cells, and cell-byproducts back into bottle, which becomes the "harvest solution." The harvest solution is collected in a compartment of vessel 208. After the harvest solution is collected, a DPBS wash is performed at step S7 by actuating the valves at inlets 220 and 222 so that inlet 222 is closed and inlet 220 is open. As the piston 206 is drawn up, DPBS wash enters the vessel 202 from the vessel 212 to perform the wash. The valve at inlet 222 can then be opened and the valve at inlet 220 closed, so that, as the piston 206 descends, the DPBS wash is collected in the harvest solution collection in vessel 208. According to the above-described methods, it is possible to harvest viable cells at high yields as described herein.

During cell culture, the culture medium is depleted due to cell metabolism. Thus, the system 200 may include a number of sensors (e.g., probes, single use patches, RAMAN, etc.) to read environmental conditions (e.g., pH, $CO_2$, DO, temperature, fluid flow, shear stress, cell density) to allow for monitoring and control of the bioreactor 200 via, for example, a PID feedback loop to the system. As an example, should the dissolved oxygen (DO) be too low, the flow of replenished medium through the cell culture substrate can be increased. In addition, the one or more inlets 220, 222 may provide inlets to allow liquid feeds (e.g., caustic, glucose, media, bolus addition) to immediately feed into the cell culture space of the vessel 202. In addition, one or more probes (e.g., biomass probes, Raman probes) may be supplied in or near the cell culture substrate 204.

The cell culture substrate is porous to allow perfusion of cells, media, nutrients, and cell by-products through the substrate and to allow spent media with cell secreted material (e.g., recombinant protein, antibody, virus particles, DNA, RNA, sugars, lipids, biodiesel, inorganic particles, butanol, metabolic byproducts) to pass through the substrate and be harvested. Further details of the cell culture substrate according to embodiments are provided below.

The vessel 202 can be plastic, glass, ceramic or stainless steel. According to some embodiments, all or part of the vessel 202 may be made of a transparent material or may include one or more transparent windows in the outer wall of the vessel 202 to allow for inspection of the interior of the vessel 202 via the human eye or any of a number of sensors, probes, cameras, or monitoring units. For example, according to an aspect of some embodiments, an optical camera or Raman spectroscopy probe can be used to monitor the cell culture progress within the cavity of the vessel 202.

Figure 4:
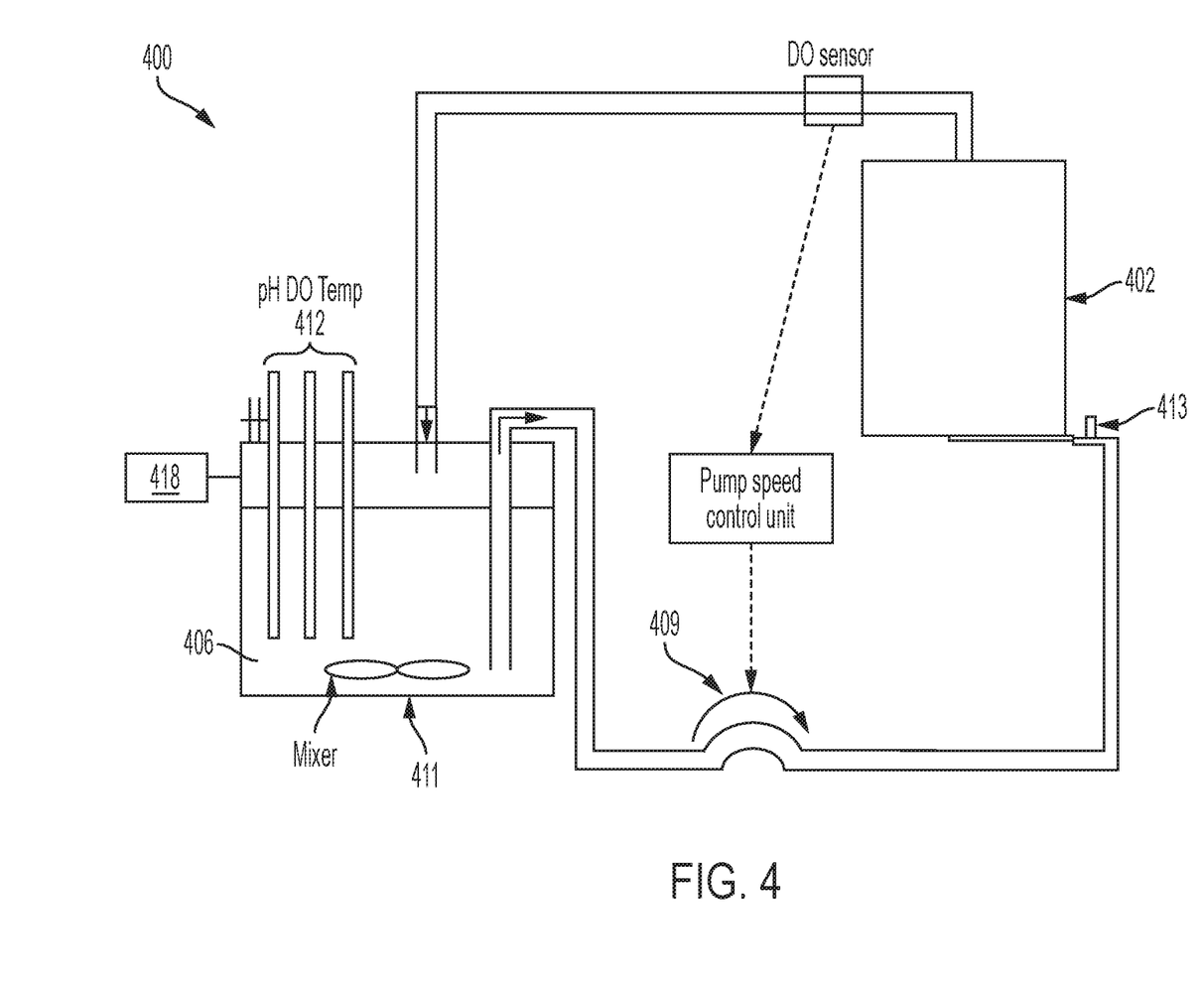
FIG. 4 is a schematic illustrating a bioprocessing system incorporating a packed-bed bioreactor according to embodiments of the present disclosure.

FIG. 4 shows a bioreactor 402 as described herein incorporated into a bioprocessing system 400, according to one or more embodiments. The system 400 includes a media conditioning vessel 411 for proper maintenance of cell culture media parameters such as pH, temperature, and oxygenation level, for example. Automatically controlled pump 409 is used to perfuse media through the bioreactor 402. Bioreactor inlet 413 is equipped with additional 3-way port to facilitate cell inoculation or collection of harvested cells. The system 400 may include in-line sensors, as well as the sensors in the media conditioning vessel 411.

As described above, the bioreactor according to embodiments of this disclosure can include one or more ports and sensors for monitoring and adjusting of medium and cell culture environment within the vessel. However, according to some embodiments, cell culture media sensing and conditioning can be performed in a second vessel that is external to the bioreactor. For example, FIG. 4 demonstrates the schematics of bioreactor vessel 402 that is connected to main external components comprised of a media conditioning vessel, a pump allowing the flow of media into the bioreactor and external dissolved oxygen sensor that support required process conditions for successful bioprocess. Cell culture media is conditioned in media conditioning vessel 411, where proper pH, temperature and dissolved oxygen levels are maintained. Subsequently media is perfused through the bioreactor by pump 409. Flow rate of pump 409 is integrated into a feedback loop which is automatically adjusts to maintain minimal predefined level of dissolved oxygen in media exiting the bioreactor. All transfection reagents, nutrients and additional media supplements required by given bioprocess can be introduced into bulk media and spent media can removed via the media conditioning vessel 411. At the end of the process, media can be drained from bioreactor and refilled with cells harvesting solution. After incubating the packed bed in harvesting solution for predefined time that is sufficient for cells to detach from the substrate cells are harvested by reverse flow through applying air pressure at bioreactor outlet to achieve flow rate in a range of 70 ml/cm$^2$ (cross sectional packed bed area)/min. Cells are harvested at the bioreactor 3-way port 413. Cells can also be lysed directly in the bioreactor and lysate solution containing AVV particles can be collected through 3-way port 413.

The media conditioning vessel 411 can include sensors and control components found in typical bioreactor used in the bioprocessing industry for a suspension batch, fed-batch or perfusion culture. These include but are not limited to DO oxygen sensors, pH sensors, oxygenator/gas sparging unit, temperature probes, and nutrient addition and base addition ports. A gas mixture supplied to sparging unit can be controlled by a gas flow controller for $N_2$, $O_2$, and $CO_2$ gasses. The media conditioning vessel 411 also contains an impeller for media mixing. All media parameters measured by sensors listed above can be controlled by a media conditioning control unit 418 in communication with the media conditioning vessel 411, and capable of measuring and/or adjusting the conditions of the cell culture media 406 to the desired levels.

The media from the media 406 conditioning vessel 411 is delivered to the bioreactor 402 via an inlet, which may also include an injection port for cell inoculum to seed and begin culturing of cells. The bioreactor vessel 402 may also include on or more outlets through which the cell culture media exits the vessel 402. In addition, cells or cell products may be output through the outlet. To analyze the contents of the outflow from the bioreactor 402, one or more sensors 412 may be provided in the line. In some embodiments, the system 400 includes a flow control unit for controlling the flow into the bioreactor 402. For example, the flow control unit may receive a signal from the one or more sensors 412 and, based on the signal, adjust the flow into the bioreactor 402 by sending a signal to a pump (e.g., peristaltic pump) upstream of the inlet 408 to the bioreactor 402. Thus, based on one or a combination of factors measured by the sensors 412, the pump can control the flow into the bioreactor 402 to obtain the desired cell culturing conditions.

The media perfusion rate is controlled by the signal processing unit that collects and compares sensors signals from media conditioning vessel 411 and sensors located at the packed bed bioreactor outlet. Because of the pack flow nature of media perfusion through the packed bed bioreactor 402, nutrients, pH and oxygen gradients are developed along the packed bed. The perfusion flow rate of the bioreactor can be automatically controlled by the flow control unit operably connected to the peristaltic pump, according to the flow chart in FIG. 5.

Figure 5:
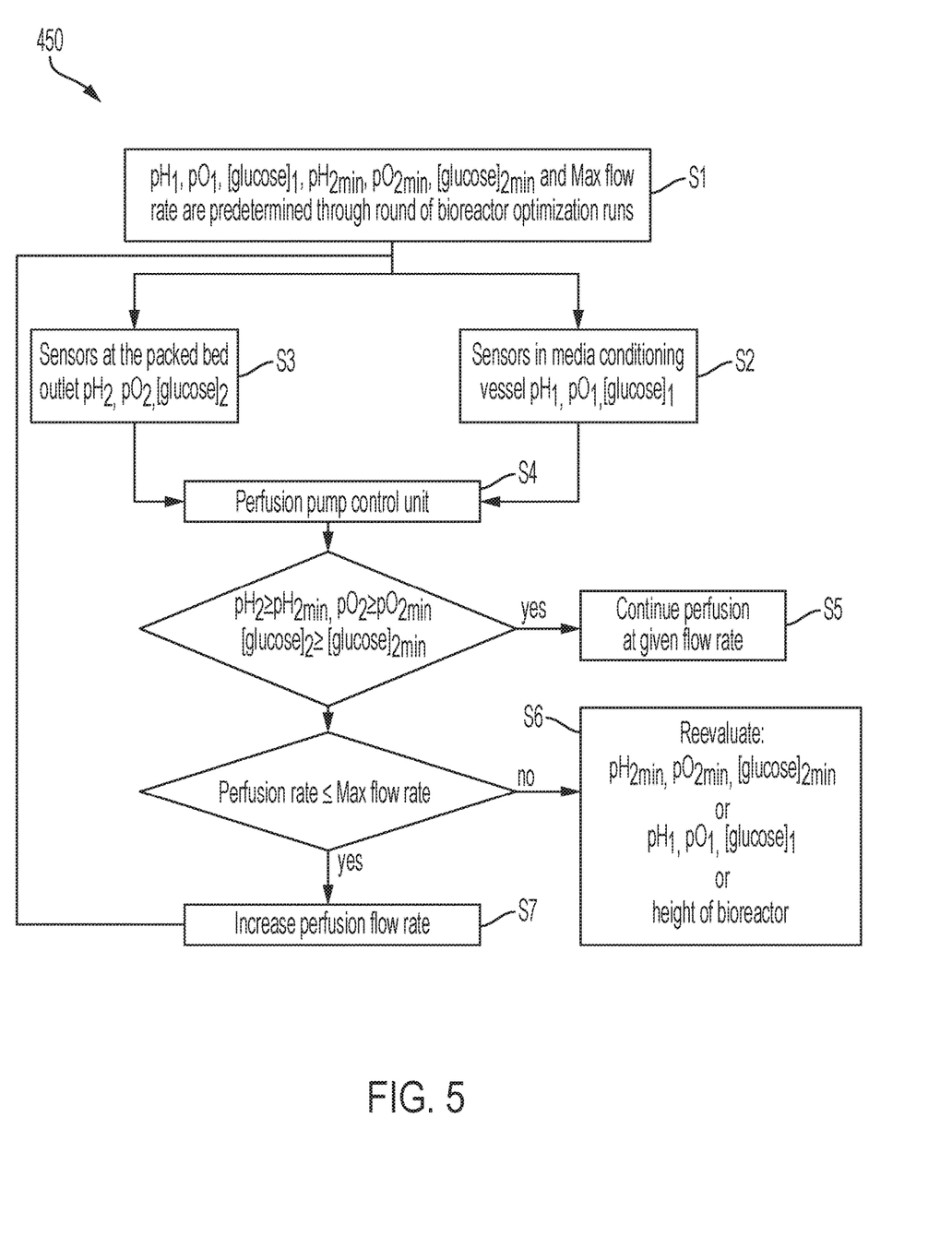
FIG. 5 shows an operation for controlling a perfusion flow rate of a cell culture system, according to one or more embodiments.

FIG. 5 shows an example of a method 450 for controlling the flow of a perfusion bioreactor system, such as the system 400 of FIG. 4. According to the method 450, certain parameters of the system 400 are predetermined at step S1 through bioreactor optimization runs. From these optimization runs, the values of $pH_1$, $pO_1$, $[glucose]_1$, $pH_2$, $pO_2$, $[glucose]_2$, and maximum flow rate can be determined. The values for $pH_1$, $pO_1$, and $[glucose]_1$ are measured within the cell culture chamber of the bioreactor 402 at step S2, and $pH_2$, $pO_2$, and $[glucose]_2$ are measured by sensors 412 in the media conditioning vessel 411 at step S3 (or in the bioreactor according to embodiment discussed herein). Based on these values at S2 and S3, a perfusion pump control unit makes determinations at S4 to maintain or adjust the perfusion flow rate. For example, a perfusion flow rate of the cell culture media to the cell culture chamber may be continued at a present rate if at least one of $pH_2 \geq pH_{2min}$, $pO_2 \geq pO_{2min}$, and $[glucose]_2 \geq [glucose]_{2min}$ (S5). If the current flow rate is less than or equal to a predetermined max flow rate of the cell culture system, the perfusion flow rate is increased (S7). Further, if the current flow rate is not less than or equal to the predetermined max flow rate of the cell culture system, a controller of the cell culture system can reevaluate at least one of: (1) $pH_{2min}$, $pO_{2min}$, and $[glucose]_{2min}$; (2) $pH_1$, $pO_1$, and $[glucose]_1$; and (3) a height of the bioreactor vessel (S6).

Embodiments of the present disclosure include bioreactors and cell culture substrates used therein, including substrates that are cell growth matrices and/or packed-bed systems for anchorage dependent cells that enable easy and effective scale-up to any practical production scale for cells or cell derived products (e.g., proteins, antibodies, viral particles). In one embodiment, a matrix is provided with a structurally defined surface area for adherent cells to attach and proliferate that has good mechanical strength and forms a highly uniform multiplicity of interconnected fluidic networks when assembled in a packed bed or other bioreactor. In particular embodiments, mechanically stable, non-degradable woven meshes can be used to support adherent cell production. Uniform cell seeding of such a matrix is achievable, as well as efficient harvesting of cells or other products of the bioreactor. In addition, the embodiments of this disclosure support cell culturing to achieve confluent monolayer or multilayer of adherent cells on disclosed matrix, and can avoid formation of 3D cellular aggregates with limited nutrient diffusion and increased metabolite concentrations. The structurally defined matrix of one or more embodiments enables complete cell recovery and consistent cell harvesting from the packed bed of bioreactor. In another embodiment of the present disclosure, a method of cell culturing is provided using bioreactors with the matrix for bioprocessing production of therapeutic proteins, antibodies, viral vaccines, or viral vectors.

In one or more embodiments, the cell culture matrix supports attachment and proliferation of anchorage dependent cells in a high volumetric density format. The matrix can be assembled and used in a bioreactor system, such as a perfused back bed bioreactor as described herein, and provide uniform cell distribution during the inoculation step, while preventing formation of large and/or uncontrollable cell aggregates inside the matrix or packed bed. Thus, the matrix eliminates diffusional limitations during operation of the bioreactor. In addition, the matrix enables easy and efficient cell harvest from the bioreactor.

The matrix can be formed with a substrate material that of a thin, sheet-like construction having first and second sides separated by a relatively small thickness. In other words, the thickness of the sheet-like substrate is small relative to the width and/or length of the first and second sides of the substrate. In addition, a plurality of holes or openings are formed through the thickness of the substrate. The substrate material between the openings is of a size and geometry that allows cells to adhere to the surface of the substrate material as if it were a two-dimensional (2D) surface, while also allowing adequate fluid flow around the substrate material and through the openings. In some embodiments, the substrate is a polymer-based material, and can be formed as a molded polymer sheet; a polymer sheet with openings punched through the thickness; a number of filaments that are fused into a mesh-like layer; or a plurality of filaments that are woven into a mesh layer. The physical structure of the matrix has a high surface-to-volume ratio for culturing anchorage dependent cells. According to various embodiments, the matrix can be arranged or packed in a bioreactor in certain ways to obtain uniform cell seeding, uniform media perfusion, and efficient cell harvest.

The cell culture substrate can be a woven mesh layer made of a first plurality of fibers running in a first direction and a second plurality of fibers running in a second direction. The woven fibers of the substrate form a plurality of openings. The size and shape of the openings can vary based on the type of weave (e.g., number, shape and size of filaments; angle between intersecting filaments, etc.). An opening can be defined by a certain width or diameter. A woven mesh may be considered, on a macro-scale, a two-dimensional sheet or layer. However, a close inspection of a woven mesh reveals a three-dimensional structure due to the rising and falling of intersecting fibers of the mesh. Thus, a thickness of the woven mesh may be thicker than the thickness of a single fiber.

The woven mesh can be comprised of monofilament or multifilament polymer fibers. In one or more embodiments, a monofilament fiber may have a diameter in a range of about 50 μm to about 1000 μm. On a microscale level, due to the scale of the fiber compared to the cells (e.g., the fiber diameters being larger than the cells), the surface of monofilament fiber is presented as regular 2D surface for adherent cells to attach and proliferate. Such fibers are woven into a mesh that has a defined pattern and a certain amount of structural rigidity. Fibers can be woven into a mesh with openings ranging from about 100 μm×100 μm to about 1000 μm×1000 μm. These ranges of the filament diameters and opening diameters are examples of some embodiments, but are not intended to limit the possible feature sizes of the mesh according to all embodiments.

The substrate mesh can be fabricated from monofilament or multifilament fibers of polymeric materials compatible in cell culture applications, including, for example, polystyrene, polyethylene terephthalate, polycarbonate, polyvinylpyrrolidone, polybutadiene, polyvinylchloride, polyethylene oxide, polypyrroles, and polypropylene oxide. Mesh substrates may have a different structure patterns or weaves, including, for example knitted, warp-knitted, or woven (plain weave, twilled weave, dutch weave, five needle weave).

The surface chemistry of the mesh filaments may need to be modified to provide desired cell adhesion properties. Such modifications can be made through the chemical treatment of the polymer material of mesh or grafting cell adhesion molecules to the filament surface. Alternatively, meshes can be coated with thin layer of biocompatible hydrogels that demonstrate cell adherence properties, including, for example, collagen or Matrigel®. Alternatively, surfaces of filament fibers of the mesh can be rendered with cell adhesive properties through the treatment processes with various types of plasmas, process gases, and/or chemicals known in the industry.

The woven mesh substrate may be provided in a number of discs with a center hole configured to surround the center column of the bioreactor described herein. A plurality of such discs can be stacked in the outer region of the bioreactor to form the packed bed.

According to some embodiments, the cell culture substrate is a dissolvable foam scaffold comprising an ionotropically crosslinked polygalacturonic acid compound selected from at least one of: pectic acid; partially esterified pectic acid, partially amidated pectic acid and salts thereof; and at least one first water-soluble polymer having surface activity.

Embodiments of this disclosure can achieve viral vector platforms of a practical size that can produce viral genomes on the scale of about $10^{15}$ to about $10^{18}$ or more viral genomes per batch. For example, in some embodiments, the viral genome yield can be about $10^{15}$ to about $10^{16}$ viral genomes or batch, or about $10^{16}$ to about $10^{19}$ viral genomes per batch, or about $10^{16}$-$10^{18}$ viral genomes per batch, or about $10^{17}$ to about $10^{19}$ viral genomes per batch, or about $10^{18}$ to about $10^{19}$ viral genomes per batch, or about $10^{18}$ or more viral genomes per batch.

In addition, the embodiments disclosed herein enable not only cell attachment and growth to a cell culture substrate, but also the viable harvest of cultured cells. The inability to harvest viable cells is a significant drawback in current platforms, and it leads to difficulty in building and sustaining a sufficient number of cells for production capacity. According to an aspect of embodiments of this disclosure, it is possible to harvest viable cells from the cell culture substrate, including between 80% to 100% viable, or about 85% to about 99% viable, or about 90% to about 99% viable. For example, of the cells that are harvested, at least 80% are viable, at least 85% are viable, at least 90% are viable, at least 91% are viable, at least 92% are viable, at least 93% are viable, at least 94% are viable, at least 95% are viable, at least 96% are viable, at least 97% are viable, at least 98% are viable, or at least 99% are viable. Cells may be released from the cell culture substrate using, for example, trypsin, TrypLE, or Accutase.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

Illustrative Embodiments

The following is a description of various aspects of implementations of the disclosed subject matter. Each aspect may include one or more of the various features, characteristics, or advantages of the disclosed subject matter. The implementations are intended to illustrate a few aspects of the disclosed subject matter and should not be considered a comprehensive or exhaustive description of all possible implementations.

Aspect 1 pertains to a cell culture system comprising: a cell culture vessel comprising: an interior cavity configured to house a cell culture substrate in a cell culture space, and at least one port configured for at least one of fluid inlet to the interior cavity and fluid outlet from the interior cavity, a piston comprising a distal end disposed in the cell culture vessel above the cell culture space, the distal end of the piston being sealed with an airtight seal within the interior cavity; and a driver coupled to the piston and configured to move the piston to increase and decrease a distance between the distal end and the cell culture space; wherein the driver is configured to pressurize the interior cavity via actuation of the piston to harvest cells from the cell culture space through the at least one port.

Aspect 2 pertains to the cell culture system of Aspect 1, further comprising a cell harvest chamber fluidly connected to the at least one port and configured to capture the cells harvested from the cell culture space.

Aspect 3 pertains to the cell culture system of Aspect 1 or Aspect 2, further comprising a dissociation solution chamber fluidly connected to the at least one port and configured to contain a dissociation solution.

Aspect 4 pertains to the cell culture system of Aspect 3, wherein the dissociation solution is configured to release cells from a cell substrate in the cell culture space.

Aspect 5 pertains to the cell culture system of Aspect 3 or Aspect 4, wherein the system is configured to increase a distance between the distal end of the piston and the cell culture space to draw the dissociation solution into the interior cavity.

Aspect 6 pertains to the cell culture system of Aspect 5, wherein the system is configured to decrease the distance between the distal end of the piston and the cell culture space to expel the dissociation solution from the interior cavity.

Aspect 7 pertains to the cell culture system of any of Aspects 1-6, further comprising a wash chamber fluidly connected to the at least one port and configured to contain a wash solution.

Aspect 8 pertains to the cell culture system of Aspect 7, wherein the wash solution is DPBS.

Aspect 9 pertains to the cell culture system of Aspect 7 or Aspect 8, wherein the system is configured to pump the wash solution into the interior cavity via the at least one port.

Aspect 10 pertains to the cell culture system of any of Aspects 1-9, further comprising a cell culture substrate disposed within the cell culture space.

Aspect 11 pertains to the cell culture system of any of Aspect 1-10, further comprising a controller configured to control at least one of the driver, media temperature, media flow rate, and supply of at least one of media, oxygen, caustic, and cell nutrients to the interior cavity.

Aspect 12 pertains to the cell culture system of Aspect 11, the system further comprising one or more sensors configured to measure one or more conditions in within the vessel.

Aspect 13 pertains to the cell culture system of Aspect 12, wherein the one or more conditions comprise pH, dissolved oxygen, temperature, composition, analyte levels, and spectral characteristics.

Aspect 14 pertains to the cell culture system of any of Aspects 1-13, wherein the cell culture substrate comprises a porous material.

Aspect 15 pertains to the cell culture system of Aspect 14, wherein the cell culture substrate comprises at least one of polystyrene, polyethylene terephthalate, polycarbonate, polyvinylpyrrolidone, polybutadiene, polyvinylchloride, polyethylene oxide, polypyrroles, and polypropylene oxide.

Aspect 16 pertains to the cell culture system of Aspect 14 or Aspect 15, wherein the cell culture substrate comprises at least one of a molded polymer lattice, a 3D-printed polymer lattice sheet, and a woven mesh sheet.

Aspect 17 pertains to the cell culture system of any of Aspects 14-16, wherein the cell culture substrate comprises the woven mesh comprising one or more fibers.

Aspect 18 pertains to the cell culture system of Aspect 17, wherein the one or more fibers have a fiber diameter from about 50 µm to about 1000 µm, from about 50 µm to about 600 µm, from about 50 µm to about 400 µm, from about 100 µm to about 325 µm, or from about 150 µm to about 275 µm.

Aspect 19 pertains to the cell culture system of Aspect 17 or Aspect 18, wherein the woven mesh comprises a plurality of openings interstitial to the one or more fiber, the plurality of openings having a diameter of from about 100 µm to about 1000 µm, from about 200 µm to about 900 µm, or from about 225 µm to about 800 µm.

Aspect 20 pertains to the cell culture system of Aspect 14, wherein the cell culture substrate is a dissolvable foam scaffold.

Aspect 21 pertains to the cell culture system of Aspect 20, wherein the dissolvable foam scaffold comprises: an ionotropically crosslinked polygalacturonic acid compound selected from at least one of: pectic acid; partially esterified pectic acid, partially amidated pectic acid and salts thereof; and at least one first water-soluble polymer having surface activity.

Aspect 22 pertains to the cell culture system of Aspect 20 or Aspect 21, wherein the dissolvable foam scaffold comprises an adhesion polymer coating.

Aspect 23 pertains to the cell culture system of Aspect 22, wherein the adhesion polymer coating comprises peptides.

Aspect 24 pertains to the cell culture system of Aspect 23, wherein the adhesion polymer coating comprises peptides selected from the group consisting of BSP, vitronectin, fibronectin, laminin, Type I collagen, Type IV collagen, denatured collagen and mixtures thereof.

Aspect 25 pertains to the cell culture system of Aspect 24, wherein the adhesion polymer coating comprises Synthemax® II-SC.

Aspect 26 pertains to a method of culturing cells in a packed bed bioreactor, the method comprising: providing a cell culture vessel comprising an inlet, an outlet, and an interior cavity housing a cell culture substrate, the cell culture substrate having a surface configured for culturing cells thereon, the inlet and the outlet being fluidly connected to the interior cavity; seeding cells on the cell culture substrate; providing a cell culture media to the interior cavity to culture the cells; and harvesting at least one of the cells, the cell culture media, and one or more cell by-products from the interior cavity, wherein the harvesting comprises filling the interior cavity with a pressurized fluid to force the at least one of the cells, the cell culture media, and the one or more cell by-products from the interior cavity.

Aspect 27 pertains to the method of Aspect 26, wherein the cell culture media is provided to the interior cavity through the inlet.

Aspect 28 pertains to the method of Aspect 26 or Aspect 27, further comprising removing the cell culture media from the outlet during the culturing of the cells.

Aspect 29 pertains to the method of Aspect 28, wherein the cell culture vessel is a perfusion bioreactor.

Aspect 30 pertains to the method of any of Aspects 26-29, wherein the pressurized fluid is provided to the interior cavity via one of the inlet and the outlet, and wherein the at least one of the cells, the cell culture media, and the one or more cell by-products from the interior cavity are removed from the interior cavity by the other of the inlet and the outlet.

Aspect 31 pertains to the method of any of Aspects 26-30, further comprising, prior to harvesting, supplying a harvesting solution to the interior cavity, the harvesting solution being configured to, at least in part, separate the cells from the surface of the cell culture substrate.

Aspect 32 pertains to the method of Aspect 31, wherein the harvesting further comprising filling the interior cavity with the pressurized fluid to force the harvesting solution from the interior cavity.

Aspect 33 pertains to the method of any of Aspects 26-32, wherein the filling of the interior cavity with the pressurized fluid comprises at least one of pressurizing fluid within the interior cavity using a pump, a piston, or a moving wall of the cell culture vessel.

It is also to be understood that, as used herein the terms "the," "a," or "an," mean "at least one," and should not be limited to "only one" unless explicitly indicated to the contrary. Thus, for example, reference to "an opening" includes examples having two or more such "openings" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 10 mm" and "a dimension less than about 10 mm" both include embodiments of "a dimension less than about 10 mm" as well as "a dimension less than 10 mm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where a method consists of A+B+C, and embodiments where a method consists essentially of A+B+C.

Although multiple embodiments of the present disclosure have been illustrated in the accompanying Drawings and described in the foregoing Detailed Description, it should be understood that the disclosure is not limited to the disclosed embodiments, but is capable of numerous rearrangements, modifications and substitutions without departing from the disclosure as set forth and defined by the following claims.

The invention claimed is:

1. A cell culture system comprising:
a cell culture vessel comprising:
an interior cavity configured to house a cell culture substrate in a cell culture space, and
at least one port configured for at least one of fluid inlet to the interior cavity and fluid outlet from the interior cavity,
a piston comprising a distal end disposed in the cell culture vessel above the cell culture space, the distal end of the piston being sealed with an airtight seal within the interior cavity;
a driver coupled to the piston and configured to move the piston to increase and decrease a distance between the distal end and the cell culture space; and
a dissociation solution chamber fluidly connected to the at least one port and configured to contain a dissociation solution,
wherein the driver is configured to pressurize the interior cavity via actuation of the piston to harvest cells from the cell culture space through the at least one port.

2. The cell culture system of claim 1, further comprising a cell harvest chamber fluidly connected to the at least one port and configured to capture the cells harvested from the cell culture space.

3. The cell culture system of claim 1, wherein the dissociation solution is configured to release cells from a cell substrate in the cell culture space.

4. The cell culture system of claim 1, wherein the system is configured to increase a distance between the distal end of the piston and the cell culture space to draw the dissociation solution into the interior cavity.

5. The cell culture system of claim 4, wherein the system is configured to decrease the distance between the distal end of the piston and the cell culture space to expel the dissociation solution from the interior cavity.

6. The cell culture system of claim 1, further comprising a cell culture substrate disposed within the cell culture space.

7. The cell culture system of claim 1, further comprising a controller configured to control at least one of the driver, media temperature, media flow rate, and supply of at least one of media, oxygen, caustic, and cell nutrients to the interior cavity.

8. The cell culture system of claim 7, the system further comprising one or more sensors configured to measure one or more conditions in within the vessel, wherein the one or more conditions comprise pH, dissolved oxygen, temperature, composition, analyte levels, and spectral characteristics.

9. The cell culture system of claim 6, wherein the cell culture substrate comprises at least one of a molded polymer lattice, a 3D-printed polymer lattice sheet, a woven mesh sheet, and a dissolvable foam scaffold.

10. A cell culture system comprising:
a cell culture vessel comprising:
an interior cavity configured to house a cell culture substrate in a cell culture space, and
at least one port configured for at least one of fluid inlet to the interior cavity and fluid outlet from the interior cavity;
a piston comprising a distal end disposed in the cell culture vessel above the cell culture space, the distal end of the piston being sealed with an airtight seal within the interior cavity;
a driver coupled to the piston and configured to move the piston to increase and decrease a distance between the distal end and the cell culture space; and
a wash chamber fluidly connected to the at least one port and configured to contain a wash solution,
wherein the driver is configured to pressurize the interior cavity via actuation of the piston to harvest cells from the cell culture space through the at least one port.

11. The cell culture system of claim 10, wherein the system is configured to pump the wash solution into the interior cavity via the at least one port.

12. A method of culturing cells in a packed bed bioreactor, the method comprising:
- providing a cell culture vessel comprising an inlet, an outlet, and an interior cavity housing a cell culture substrate, the cell culture substrate having a surface configured for culturing cells thereon, the inlet and the outlet being fluidly connected to the interior cavity;
- seeding cells on the cell culture substrate;
- providing a cell culture media to the interior cavity to culture the cells; and
- harvesting at least one of the cells, the cell culture media, and one or more cell by-products from the interior cavity,
- wherein the harvesting comprises filling the interior cavity with a pressurized fluid to force the at least one of the cells, the cell culture media, and the one or more cell by-products from the interior cavity.

13. The method of claim 12, wherein the cell culture media is provided to the interior cavity through the inlet.

14. The method of claim 12, further comprising removing the cell culture media from the outlet during the culturing of the cells.

15. The method of claim 14, wherein the cell culture vessel is a perfusion bioreactor.

16. The method of claim 12, wherein the pressurized fluid is provided to the interior cavity via one of the inlet and the outlet, and
- wherein the at least one of the cells, the cell culture media, and the one or more cell by-products from the interior cavity are removed from the interior cavity by the other of the inlet and the outlet.

17. The method of claim 12, further comprising, prior to harvesting, supplying a harvesting solution to the interior cavity, the harvesting solution being configured to, at least in part, separate the cells from the surface of the cell culture substrate.

18. The method of claim 17, wherein the harvesting further comprising filling the interior cavity with the pressurized fluid to force the harvesting solution from the interior cavity.

19. The method of claim 12, wherein the filling of the interior cavity with the pressurized fluid comprises at least one of pressurizing fluid within the interior cavity using a pump, a piston, or a moving wall of the cell culture vessel.

* * * * *